US011271458B2

(12) United States Patent
Jung (10) Patent No.: US 11,271,458 B2
(45) Date of Patent: Mar. 8, 2022

(54) LAMINATED CORE MANUFACTURING APPARATUS CAPABLE OF HEATING INNER DIAMETER OF LAMINATED CORE

(71) Applicant: BMC CO., LTD., Anseong-si (KR)

(72) Inventor: In Gyu Jung, Busan (KR)

(73) Assignee: BMC CO., LTD., Anseong-si (KR)

( * ) Notice: Subject to any disclaimer, the term of this patent is extended or adjusted under 35 U.S.C. 154(b) by 537 days.

(21) Appl. No.: 16/321,469

(22) PCT Filed: May 17, 2017

(86) PCT No.: PCT/KR2017/005117
§ 371 (c)(1),
(2) Date: Jan. 29, 2019

(87) PCT Pub. No.: WO2018/038356
PCT Pub. Date: Mar. 1, 2018

(65) Prior Publication Data
US 2021/0305885 A1    Sep. 30, 2021

(30) Foreign Application Priority Data
Aug. 22, 2016    (KR) .................... 10-2016-0106118

(51) Int. Cl.
*H02K 15/02*    (2006.01)
(52) U.S. Cl.
CPC .................... *H02K 15/02* (2013.01)
(58) Field of Classification Search
CPC .................................................. H02K 15/02
See application file for complete search history.

(56) References Cited

U.S. PATENT DOCUMENTS

2008/0259561 A1* 10/2008 Chen ..................... G06F 1/20
361/690
2008/0276446 A1* 11/2008 Amano ................. H02K 1/276
29/598

(Continued)

FOREIGN PATENT DOCUMENTS

EP        2933035 A1    10/2015
JP    2001-185432 A     7/2001

(Continued)

OTHER PUBLICATIONS

International Search Report for PCT/KR2017/005117 dated Aug. 22, 2017 from Korean Intellectual Property Office.

*Primary Examiner* — Peter Dungba Vo
*Assistant Examiner* — Jose K Abraham
(74) *Attorney, Agent, or Firm* — Revolution IP, PLLC (57) ABSTRACT

A laminated core manufacturing apparatus includes an upper mold and a lower mold and enabling the manufacturing of a laminated core by stacking individual laminar members which are formed by having a strip which is sequentially transferred on an upper portion of the lower mold undergo a piercing process and a blanking process by means of punches provided to the upper mold, wherein the laminated core manufacturing apparatus further comprises: a squeeze ring installed on a lower portion of a blanking die for the blanking process; an elevating block installed on the lower portion of the squeeze ring; an elevating means for vertically moving the elevating block; and a heating block installed on an upper portion of the elevating block and positioned at an inner diameter surface of the laminated core.

3 Claims, 5 Drawing Sheets

(56) References Cited

U.S. PATENT DOCUMENTS

| | | | |
|---|---|---|---|
| 2009/0189309 A1* | 7/2009 | Matsubayashi | ... B29C 45/14065 |
| | | | 264/263 |
| 2011/0232076 A1* | 9/2011 | Matsubara | ............. B21D 28/06 |
| | | | 29/564 |
| 2013/0075029 A1 | 3/2013 | Hirata | |
| 2017/0361369 A1* | 12/2017 | Horii | ...................... H02K 15/02 |
| 2019/0259531 A1* | 8/2019 | Okudaria | ............... H02K 15/02 |

FOREIGN PATENT DOCUMENTS

| | | | | | |
|---|---|---|---|---|---|
| JP | 2001-185433 | A | | 7/2001 | |
| JP | 2008078346 | A | * | 4/2008 | ............. H01F 41/02 |
| JP | 2009-297758 | A | | 12/2009 | |
| JP | 2011-205836 | A | | 10/2011 | |
| KR | 10-2005-0026882 | A | | 3/2005 | |
| KR | 10-2007-0074711 | A | | 7/2007 | |
| KR | 10-1416627 | B1 | | 7/2014 | |
| KR | 10-2016-0015563 | A | | 2/2016 | |
| KR | 10-2016-0029404 | A | | 3/2016 | |
| KR | 10-1616987 | B1 | | 4/2016 | |
| KR | 10-1618708 | B1 | | 5/2016 | |
| KR | 10-1618709 | B1 | | 5/2016 | |
| KR | 10-1627471 | A | | 6/2016 | |

* cited by examiner

LAMINATED CORE MANUFACTURING APPARATUS CAPABLE OF HEATING INNER DIAMETER OF LAMINATED CORE

TECHNICAL FIELD

The present invention relates to an apparatus for manufacturing a core manufactured by stacking lamina members. More specifically, the present invention relates to an apparatus for manufacturing a heat sealing-type rotational laminated core, capable of heating lamina members punched out by a press upon a laminating step such that the lamina members adhere to each other, and at the same time, heating the inner diameter surface of the laminated core.

BACKGROUND ART

In general, laminated cores which are formed by stacking lamina members obtained by performing a punching and a blanking process on a strip are used as stators or rotors of motors or generators, and methods for manufacturing the same are widely known in the art.

A strip supplied to a progressive molding apparatus is subjected to a punching process and a blanking process in order, to make slots, teeth, etc., thereby sequentially forming individual lamina members, stacking the predetermined number of individual lamina members with the finally punched-out appearance and coupling the lamina members, to manufacture a laminated core for a motor. For the method for coupling lamina members, a method of forming embossing patterns on each sheet of lamina members and compressing the lamina members upon stacking for coupling, the so-called embossing lamination method, is representatively known, as disclosed in Korean Patent Laid-open No. 10-2005-0026882, etc.

In a motor core manufactured by the embossing lamination method, female and male protrusions formed in a substrate are forcedly fitted into each other for coupling, which serve as speed bumps on the road, and this causes iron loss and loss of magnetic flux density. Also, the space factor is degraded, and vibration noise occurs due to resonance phenomenon.

In order to solve these problems, a method of attaching lamina members using an adhesive or an adhesive film is suggested. These prior art documents are Korean Patent Nos. 10-16274, 10-1618708, 10-1616987, 10-1618709, etc. The prior art heats a squeeze ring in which lamina members are stacked and thermally cures an adhesive or an adhesive film applied to the lamina members, to ensure the coupling of the lamina members.

However, generally, when laminated cores are manufactured, the shape of each sheet of the core punched out by blanking is not always exactly the same, but some deviation occurs. Thus, in the case where each sheet of the core is repeatedly stacked many times, a finished product core has inconsistent concentricity or perpendicularity due to accumulated deviation, which results in product defects.

Meanwhile, the prior art discloses a technique of heating a squeeze ring in order to directly heat a core product stacked in the squeeze ring. In the case of heating the squeeze ring, however, the adhesive or the adhesive film at the outer diameter side of the core is sufficiently curable by heat, whereas the portion at the inner diameter side of the core is not heat curable sufficiently for a short period of time of stacking because the portion is heated by heat conduction of the core itself. This causes quality problems such as delamination of the stacked portion at the inner diameter side of the core, etc., since a sufficient adhesive force is not provided to the gaps between the stacked lamina members.

In order to solve the aforementioned problems, the inventor of the present invention are to provide an apparatus for manufacturing a heat sealing-type rotational laminated core, capable of stacking lamina members while rotating a squeeze ring by a predetermined pitch, and directly heating the inner diameter surface side of the laminated core.

DETAILED DESCRIPTION OF THE INVENTION

Technical Task

It is an object of the present invention to provide an apparatus for manufacturing a heat sealing-type rotational laminated core, allowing each sheet of the core stacked as a squeeze ring is heated to be stacked while rotating by a predetermined pitch.

It is another object of the present invention to provide an apparatus for manufacturing a heat sealing-type rotational laminated core, capable of directly heating the inner diameter surface side of the laminated core.

The above objects of the present invention and other inherent objects could be easily achieved by the present invention explained in the following.

Means for Solving the Task

The apparatus for manufacturing a laminated core according to the present invention comprises an upper mold (3) and a lower mold (4), and manufactures a laminated core (100) by stacking individual laminar members (101) formed by having a strip (100A) which is sequentially transferred on the upper portion of the lower mold (4) undergone a piercing process and a blanking process by punches mounted on the upper mold (3), wherein the apparatus further comprises a squeeze ring (201) installed on the lower portion of a blanking die (11) for the blanking process; an elevating block (301) installed on the lower portion of the squeeze ring (201); an elevating means (302) vertically moving the elevating block (301); and a heating block (304) installed on the upper portion of the elevating block (301) and positioned at the inner diameter surface of the laminated core (100).

In the present invention, preferably, the apparatus further comprises a heating means (202) installed on the outer circumference of the squeeze ring (201); and a rotating die (203) having the squeeze ring (201) and the heating means (202) installed therein to rotate by a predetermined pitch with the squeeze ring (201) and the heating means (202).

In the present invention, preferably, the apparatus further comprises a support pad (303) rotatably installed on the upper portion of the elevating block (301), wherein the heating block (304) is installed on the support pad (303) to rotate with the support pad (303).

In the present invention, the apparatus may further comprise a heat dissipation pad (306) installed on the lower portion of the heating block (304).

Effect of the Invention

The present invention has the effect of providing an apparatus for manufacturing a heat sealing-type rotational laminated core, (1) allowing each sheet of the core stacked as being heated to be stacked while rotating by a predetermined pitch, thereby eliminating lamination deviation of the laminated core and ensuring good perpendicularity and concentricity, etc., and (2) capable of directly heating the inner diameter surface side of the laminated core, thereby ensuring good quality of the laminated core.

Hereinafter, the present invention will be explained in detail with reference to the accompanying drawings.

BEST MODE FOR CARRYING OUT THE INVENTION

Figure 1:
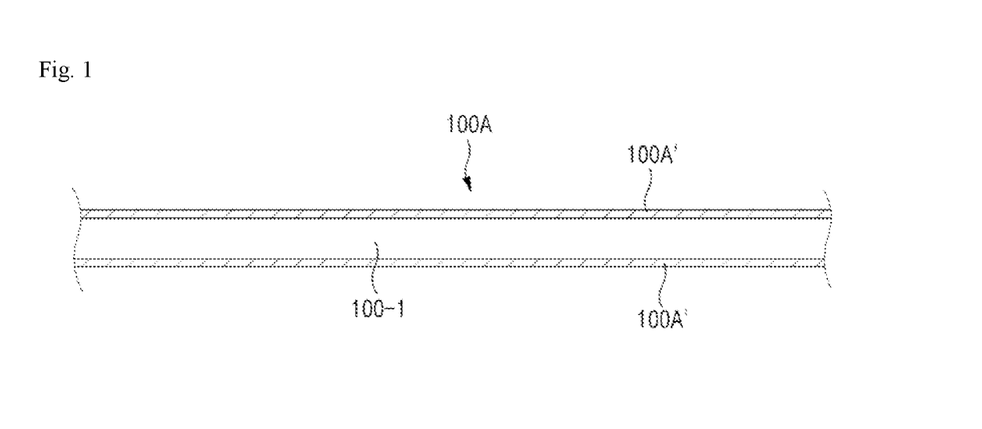
FIG. 1 is a cross-sectional view illustrating an embodiment of a strip for manufacturing lamina members employed in the present invention.

FIG. 1 is a cross-sectional view illustrating an embodiment of a strip (100A) for manufacturing lamina members (101) employed in the present invention.

With reference to FIG. 1, the strip (100A) employed in the present invention has a synthetic resin adhesive film (100A') deposited on the surface of a strap-shaped steel sheet (100-1) made of a thin sheet or has a synthetic resin coating layer for adhesion applied thereto. In the present invention, it is preferable to use the strip (100A) in such shape, but it is not necessarily limited only to such strip (100A). For example, the synthetic resin adhesive film (100A') may be formed only on one surface of the steel sheet (100-1), and the form in which an adhesive, not the adhesive film (100A'), is applied to the surface of the steel sheet (100-1) may be employed. An adhesive can also be employed in the form of applying the adhesive to the surface of the steel sheet (100-1) with no adhesive applied thereto within an apparatus (1) for manufacturing a laminated core during one of a piercing, a blanking process or a laminating process, while performing the corresponding process. Hereinafter, the present invention will be explained with the steel sheet (100-1) having the adhesive film (100A') attached thereon, as an embodiment of the strip (100A), for the sake of convenience of explanation.

Figure 2:
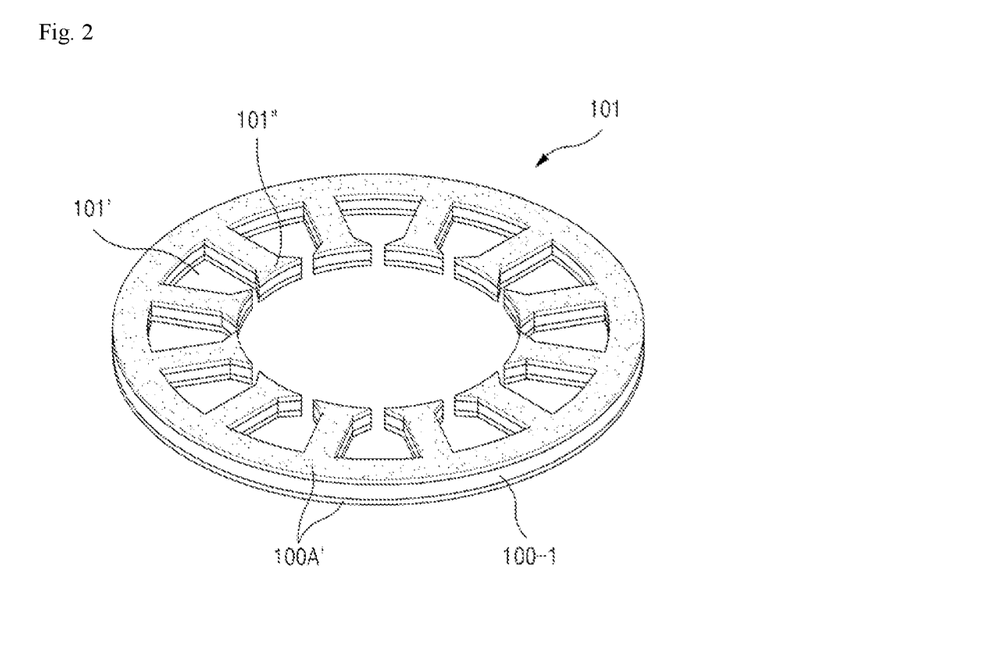
FIG. 2 is a perspective view illustrating lamina members employed in the present invention.
Figure 3:
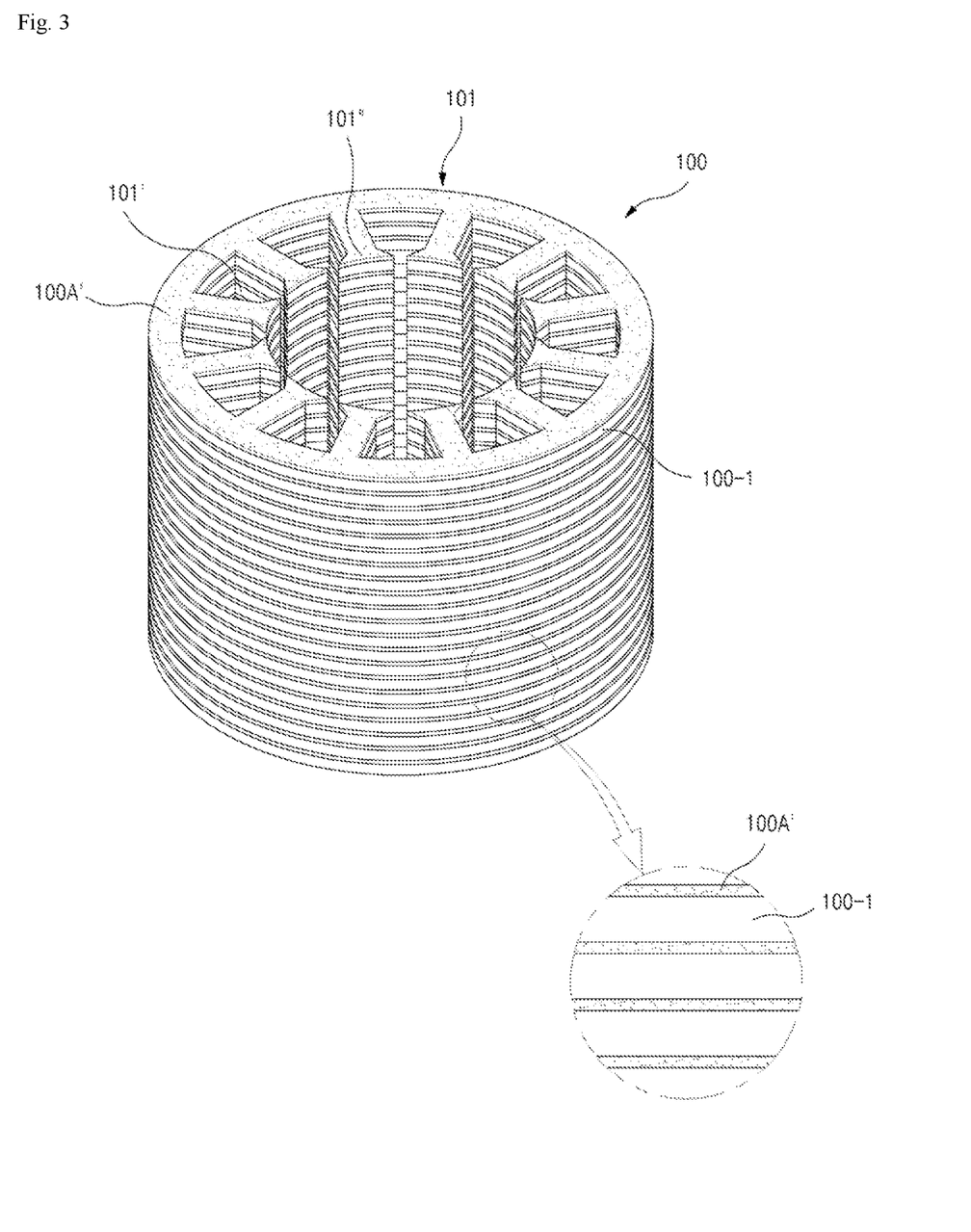
FIG. 3 is a perspective view of a laminated core manufactured by stacking the lamina members employed in the present invention.

FIG. 2 is a perspective view illustrating the lamina members (101) employed in the present invention. FIG. 3 is a perspective view of a laminated core (100) manufactured by stacking the lamina members (101) employed in the present invention.

With reference to FIG. 2, the lamina member (101), a sheet of the laminated core, is illustrated, which is manufactured by performing a punching and a blanking process on the strip (100A) by the apparatus (1) explained below. The laminated core (100) manufactured by stacking the predetermined number of sheets of lamina member (101) is illustrated in FIG. 3.

The laminated core (100) is made in a state in which the synthetic resin film (100A') or adhesive deposited on the surface of a lamina member (101) is cured by heat to be bonded to the other surface of the lamina member (101).

Figure 4:
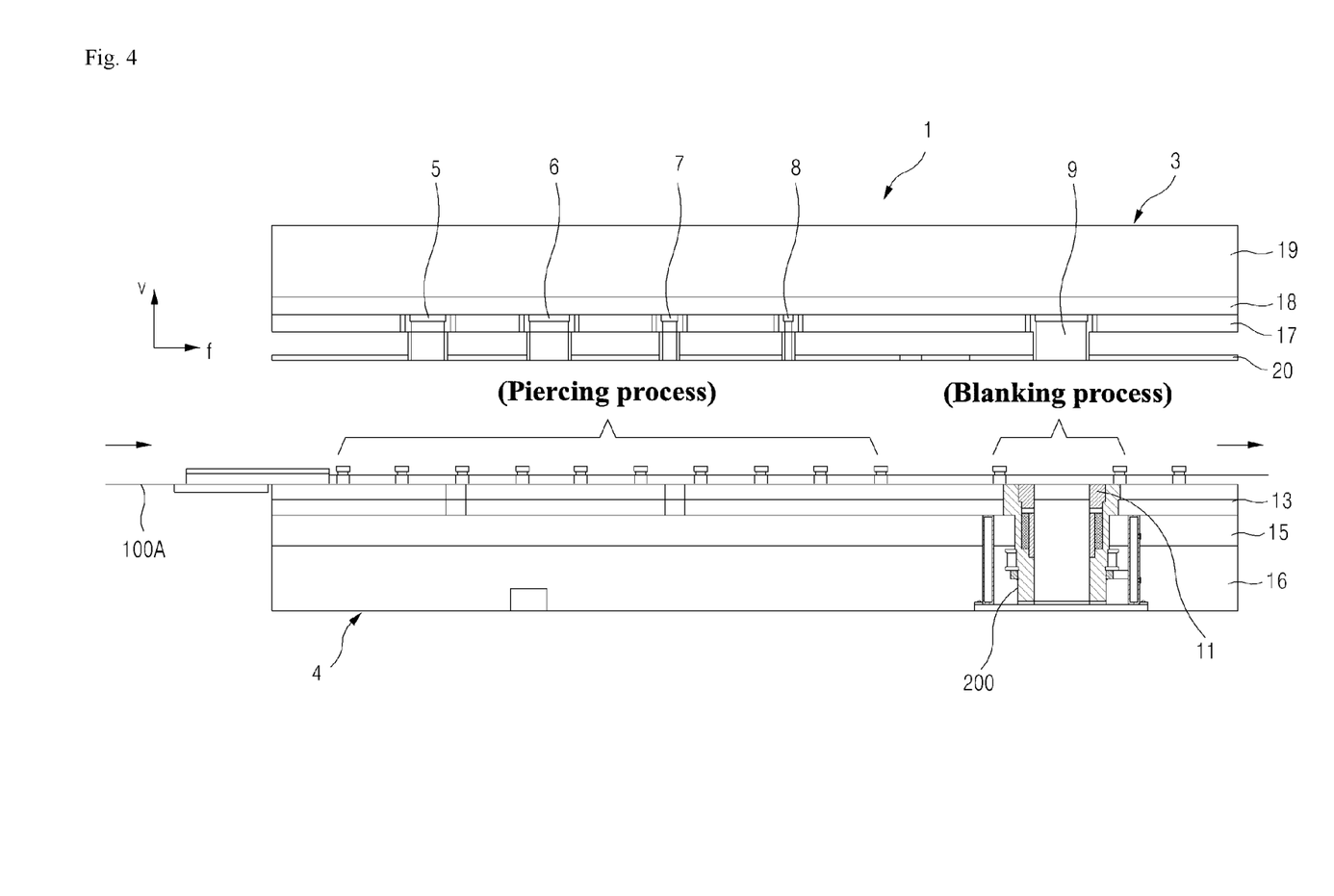
FIG. 4 is a cross-sectional view illustrating an apparatus for manufacturing a heat sealing-type rotational laminated core according to the present invention.

FIG. 4 is a cross-sectional view illustrating the apparatus (1) for manufacturing a heat sealing-type rotational laminated core according to the present invention.

The strip (100A) having the synthetic resin adhesive film (100A') deposited thereon or having the synthetic resin for adhesion coated thereon, which is supplied to the apparatus (1) illustrated in FIG. 4, is subjected to a punching process and a blanking process in order, to make slots (101'), teeth (101"), etc., thereby sequentially forming individual lamina members (101), and the predetermined number of finally punched-out lamina members (101) is stacked, followed by heat curing, to manufacture the laminated core (100) of a motor.

Specifically, with reference to FIG. 4, the apparatus for manufacturing a laminated core according to the present invention employs press processing which performs continuing operation on the strip (100A) having the synthetic resin adhesive film (100A') deposited thereon or having the synthetic resin for adhesion coated thereon, which is progressively transferred. That is, the apparatus (1) according to the present invention is preferably a progressive molding apparatus, comprising an upper mold (3) and a lower mold (4).

The upper mold (3) is positioned above the lower mold (4) and moves in the elevating direction (V) towards the lower mold (4). The motion of the upper mold (3) is performed as the upper mold (3) is mounted on a press machine and the press machine is driven. In the upper portion of the lower mold (4), the strip (100A) is transferred along the moving direction (f).

The upper mold (3) may comprise piercing punches (5, 6, 7, 8) and a blanking punch (9) which punch the strip (100A), a punch plate (17) on which the punches are mounted, and a punch holder (19) which supports the punch plate (17) thereabove. Here, FIG. 4 illustrates four piercing punches (5, 6, 7, 8). However, the number or shape of piercing punches can be modified depending on the shape or size, etc. of a core to be manufactured, and the strip (100A) is subjected to punching and blanking in the order according to a control program loaded on a microprocessor which is not illustrated.

In addition, the upper mold (3) may be provided with a punch backing plate (18) between the punch holder (19) and the punch plate (17), for supporting the punches, and a stripper plate (20) for guiding the punches to move to accurate positions and stripping the strip (100A) inserted upon punching.

The lower mold (4) may comprise a die holder (16) which is mounted on a press machine to keep the overall balance of the lower mold (4), a die plate (13) which is seated on the upper portion of the die holder (16), and a die backing plate (15) which is positioned between the die holder (16) and the die plate (13) to support the pressure on the die plate (13).

In addition, a cylinder-shaped blanking die (11) having a hollow part formed at the position corresponding to the blanking punch (9) is mounted within the lower mold (4). The blanking die (11) discharges the lamina members (101), which are individual sheets of the core which are punched out by the blanking punch (9) and separated from the strip (100A), downwards, and the discharged lamina members (101) are stacked while passing through a squeeze ring (201)

installed on the lower portion of the blanking die (11) and are heated at the same time, thereby performing adhesion between the lamina members (101) by thermally curing the adhesive film.

A lamina member (101) punched out from the blanking die (11) is press-fitted into the squeeze ring (201) of a lamination device (200) on the lower portion of the blanking die (11), on which another lamina member (101) is sequentially stacked, thereby being pushed down to the lower portion of the squeeze ring (201). A core in which the predetermined number of sheets is laminated becomes one product and is unloaded from the lower portion of the squeeze ring (201) to the outside.

The process for manufacturing a laminated core employing the apparatus (1) for manufacturing a laminated core according to the present invention includes a piercing process, a blanking process and a laminating process.

During the piercing process, basic shapes of the slots (101'), teeth (101"), shaft hole, etc., excluding the appearance of the core, are formed on the strip (100A). Here, the strip (100A) is subjected to piercing processing by the piercing punches (5, 6, 7, 8) which are mounted on the upper mold (3) and move in up and down direction while being transferred progressively by one pitch within the molding device (1). During the blanking process, the strip (100A) is punched out to form one lamina member (101), and the formed lamina members (101) are sequentially laminated during the following laminating process.

The laminating process performs heating the stacked lamina members for thermally curing an adhesive film or an adhesive, preferably, together with stacking. Also, as one lamina member is stacked while being heated at the same time, the squeeze ring (201) rotates by a predetermined pitch for the stacking. The constitution therefor will be explained with reference to the following FIG. 5 and FIG. 6.

Figure 5:
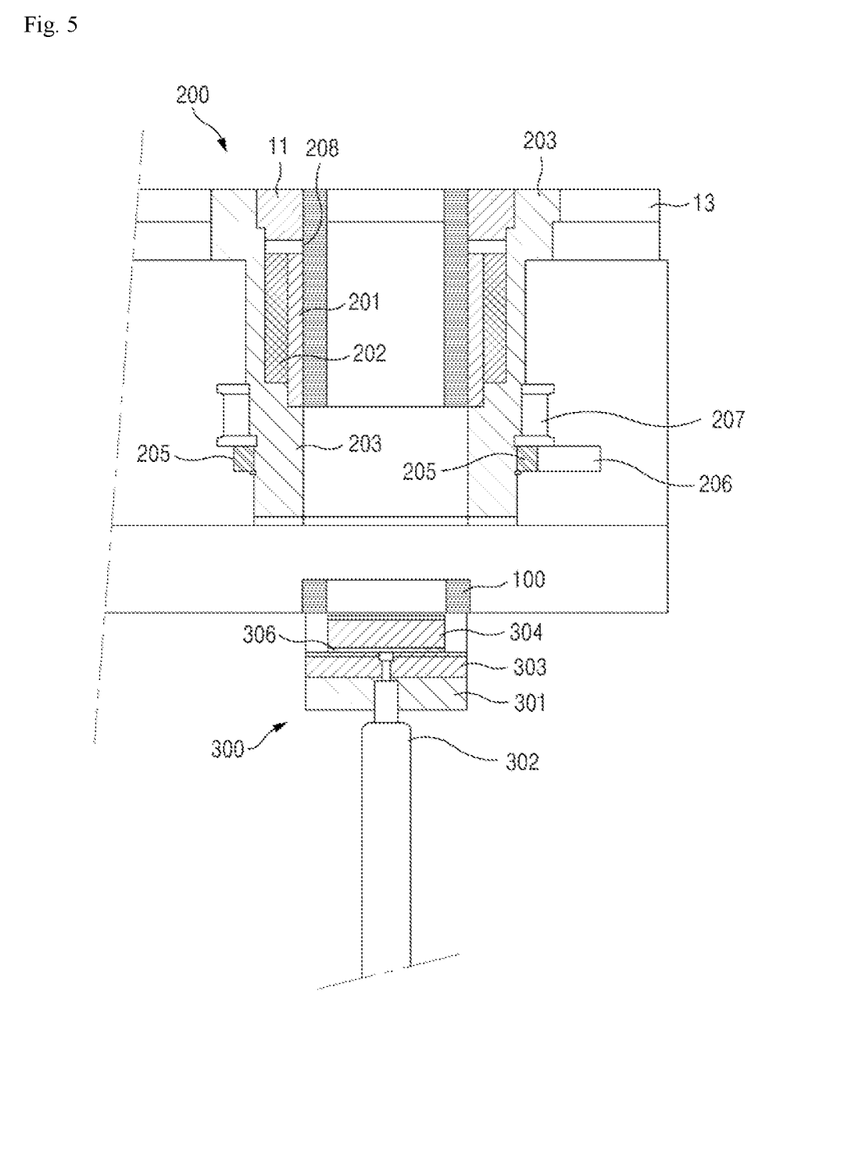
FIG. 5 is a cross-sectional view illustrating a lamination device and an inner diameter heating device of the apparatus for manufacturing a heat sealing-type rotational laminated core according to the present invention.
Figure 6:
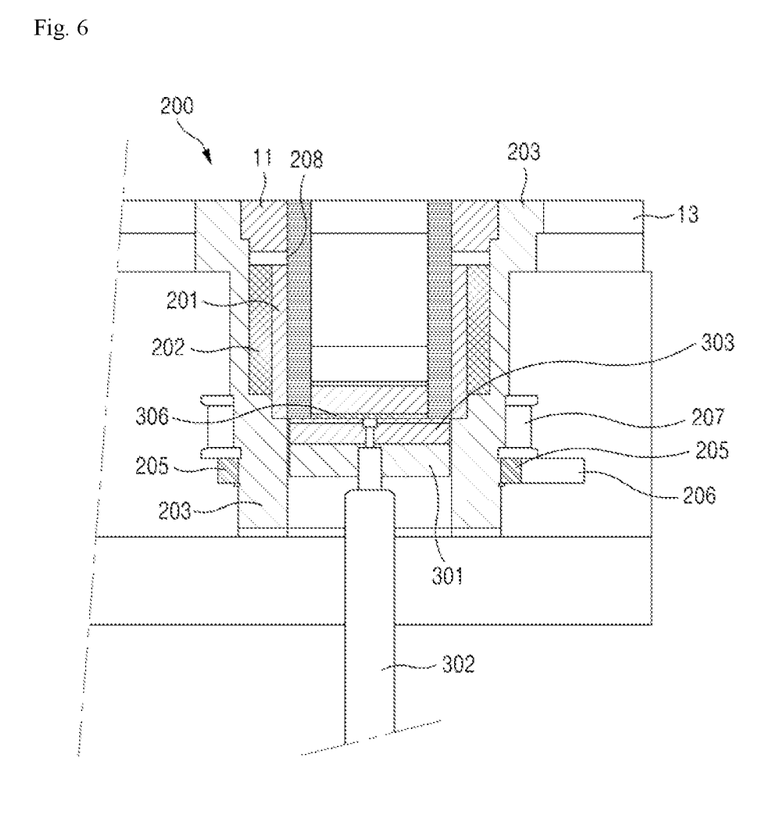
FIG. 6 is a cross-sectional view illustrating an operational embodiment of the lamination device and the inner diameter heating device of the apparatus for manufacturing a heat sealing-type rotational laminated core according to the present invention.

FIG. 5 is a cross-sectional view illustrating the lamination device (200) and an inner diameter heating device (300) of the apparatus (1) for manufacturing a heat sealing-type rotational laminated core according to the present invention. FIG. 6 is a cross-sectional view illustrating an operational embodiment of the lamination device and the inner diameter heating device of the apparatus for manufacturing a heat sealing-type rotational laminated core according to the present invention.

As illustrated in FIG. 5, the lamination device (200) of the apparatus (1) for manufacturing a laminated core according to the present invention comprises the squeeze ring (201) installed on the lower portion of the blanking die (11), a heating means (202), a rotating die (203), a rotating electrode (205), a stationary electrode (206) and a rotary driving member (207).

The squeeze ring (201) is a part in which the lamina members (101) formed from the blanking process are stacked, and upper lamina members (101) push lower lamina members down as multiple lamina members (101) are stacked, and thus a laminated core moves downwards. During the movement, the squeeze ring (201) is heated by the heating means (202) installed on the outer circumferential surface of the squeeze ring (201). The squeeze ring (201) is heated and remains at a predetermined temperature required for curing. The thus-heated squeeze ring (201) heats the stacked lamina members (101) to thermally cure the adhesive film or the adhesive on the surface thereof so that the lamina members (101) adhere well to each other. The heating means (202) is preferably a PTC ceramic heater, but is not necessarily limited thereto. The heating means (202) is also installed preferably on the outer circumferential surface of the squeeze ring (201), but is not necessarily limited thereto. The heating means (202) may be positioned inside the squeeze ring (201) or installed at any other positions.

As the squeeze ring (201) and the heating means (202) are installed inside the rotating die (203), the squeeze ring (201) and the heating means (202) rotate together with the rotating die (203) when the rotating die (203) rotates by a predetermined pitch. In order to support the rotation of the rotating die (203), a plurality of bearings (not illustrated) may be employed at necessary positions.

The heating means (202) of the rotating die (203) is to be heated while rotating. For the heating of the heating means (202), the rotating electrode (205) electrically connected to the heating means (202) is installed on the outer circumferential surface of the rotating die (203). The rotating electrode (205), an electrode in the shape of a consecutive ring, rotates together with the rotating die (203) and is electrically connected to the stationary electrode (206) separately arranged at the outer portion side of the rotating die (203). That is, the stationary electrode (206) remains to be always electrically connected to the rotating electrode (205) although the rotating die (203) rotates, such that the heating means (202) is electrically heated even during the rotation of the rotating die (203).

The rotary driving member (207) is provided on the outer circumferential surface of the rotating die (203). For the rotary driving member (207), various types of driving means that can rotate the rotating die (203), i.e., a member that can transfer a driving force of a motor, etc. to the rotating die (203), are used. For example, a gear, a pulley, etc., may be employed. The rotary driving member (207) illustrated in FIG. 5 is a pulley. A driving belt (not illustrated) connected to the driving shaft of a separately installed motor (not illustrated) is configured to be connected to the rotary driving member (207) such that the rotating die (203) rotates as the rotary driving member (207) rotates. It is preferable to perform the rotation of the rotating die (203) by a predetermined pitch. For example, when one pitch is set at 60°, one lamina member is blanked and a lamina member stacked thereon is stacked in the state of being rotated by 60°. This is repeated to sequentially stack lamina members which are rotated by 60°, to manufacture a laminated core.

In order to prevent heat generated from the heating means (202) from being conducted to the blanking die (11) or die plate (13), etc., a heat dissipation pad (208) may be installed on the lower portion of the blanking die (11), etc.

The thus-configured lamination device (200) stacks lamina members and at the same time heats and rotates the lamina members by a predetermined pitch.

Meanwhile, the inner circumferential surface side of the laminated core (100) is made in a more elaborate structure such as teeth (101"), compared with the outer circumferential surface of the laminated core (100). Thus, if adhesion between the lamina members is not secured, a product defect such as vertical delamination between the teeth (101"), etc., and thus a way of directly heating the inner circumferential surface side of the laminated core (100) may be required. To this end, the manufacturing apparatus (1) of the present invention may further comprise the inner diameter heating device (300) on the lower portion of the lamination device (200).

The inner diameter heating device (300) of the present invention comprises an elevating block (301), an elevating means (302), a support pad (303) and a heating block (304).

The elevating block (301) is operated to vertically move by operation of the elevating means (302). For the elevating means (302), various known technical means such as a motor or a pneumatic cylinder, etc. can be employed to vertically move the elevating block (301). The elevating block (301) is installed to be vertically movable towards the inner diameter surface of the rotating die (203), by the elevating means (302).

The support pad (303) is installed to be freely rotatable with respect to the rotation shaft installed at the center thereof. To support the rotation, a bearing (not illustrated) may be installed on the upper portion of the elevating block (301). The support pad (303) may be omitted if the rotation is not necessary.

The heating block (304) is heated by electrical power, etc. externally supplied and positioned at the inner diameter surface of the laminated core (100) to heat the inner diameter surface of the laminated core (100). For a means for heating the heating block (304), a heating means that is typically used, such as a heating rod, etc., may be employed. The outer diameter of the heating block (304) is set to be equal to or slightly smaller in size than the inner diameter of the laminated core (100), such that the heating block (304) is positioned close to the inner diameter surface of the laminated core (100) or positioned away therefrom at a small interval. The height of the heating block (304) is set to be equal to or slightly greater than the height of the laminated core (100). By doing so, the inner diameter surface of the laminated core (100) can be more effectively heated.

With reference to FIG. 6 for more detailed explanation, the elevating block (301) is lifted by operation of the elevating means (302) to be positioned at the lower side of the squeeze ring (201). The heating block (304) is positioned at the inner diameter surface of the laminated core (100) stacked inside the squeeze ring (201) to heat the inner diameter side of the laminated core (100), and at the same time, lamina members (101) are stacked from above to push the laminated core (100) down such that one laminated core (100) is separated. Then, as illustrated in FIG. 5, the elevating block (301) is lowered, and the laminated core (100) is finished and unloaded to the outside.

The support pad (303) may be configured to rotate together with the squeeze ring (201), and may not necessarily be required to rotate 360° like the squeeze ring (201). This is because the support pad (303) is vertically movable at any time by the elevating means (302), and it is possible to heat the inner diameter even when the laminated core (100) is discharged out of the squeeze ring (201).

In order to prevent heat generated from the heating block (304) from being conducted to the elevating block (301), etc., a heat dissipation pad (306) may be further installed on the lower portion of the heating block (304).

The explanation in the present invention provided above is merely to provide examples to help understand the present invention, and is not intended to limit the scope of the present invention. The scope of the present invention shall be defined by the accompanying claims, and it should be construed that simple modifications or alternations of the present invention within the scope of the claims fall within the scope of the present invention.

What is claimed is:

1. An apparatus for manufacturing a laminated core comprising an upper mold (3) and a lower mold (4), and manufacturing a laminated core (100) by stacking individual laminar members (101) formed by having a strip (100A) which is sequentially transferred onto the upper portion of the lower mold (4) undergone a piercing process and a blanking process by punches mounted on the upper mold (3), wherein the apparatus further comprises:
    a squeeze ring (201) installed on the lower portion of a blanking die (11), the squeeze ring is positioned on an outer diameter of the laminated core for the blanking process;
    a heater (202) installed on an outer circumference of the squeeze ring (201) such that the heater is configured to heat the squeeze ring and the outer diameter of the laminated core;
    a rotating die (203), having the squeeze ring (201) and the heater (202), installed therein to rotate by a predetermined pitch with the squeeze ring (201) and the heater (202);
    an elevating block (301) installed on the lower portion of the squeeze ring (201);
    an elevating cylinder (302) vertically moving the elevating block (301); and
    a heating block (304) installed on the upper portion of the elevating block (301) and positioned at an inner diameter surface of the laminated core (100),
    wherein an outer diameter of the heating block (304) is substantially same as the inner diameter of the laminated core (100) such that the heating block is configured to heat the inner diameter of the laminated core.

2. The apparatus of claim 1, further comprising a rotatable support pad (303) installed on the upper portion of the elevating block (301), wherein the heating block (304) installed on the support pad (303) rotates with the support pad (303).

3. The apparatus of claim 1, further comprising a heat dissipation pad (306) is installed on the lower portion of the heating block (304).

* * * * *